United States Patent
Contreras

(10) Patent No.: US 10,683,450 B2
(45) Date of Patent: *Jun. 16, 2020

(54) CEMENT HAVING CROSS-LINKED PLYMERS

(71) Applicant: Saudi Arabian Oil Company, Dhahran (SA)

(72) Inventor: Elizabeth Q. Contreras, Houston, TX (US)

(73) Assignee: Saudi Arabian Oil Company (SA)

( * ) Notice: Subject to any disclaimer, the term of this patent is extended or adjusted under 35 U.S.C. 154(b) by 0 days.

This patent is subject to a terminal disclaimer.

(21) Appl. No.: 16/272,529

(22) Filed: Feb. 11, 2019

(65) Prior Publication Data

US 2019/0169482 A1 Jun. 6, 2019

Related U.S. Application Data

(62) Division of application No. 15/701,670, filed on Sep. 12, 2017, now Pat. No. 10,377,940.

(Continued)

(51) Int. Cl.
*E21B 43/16* (2006.01)
*C09K 8/46* (2006.01)
(Continued)

(52) U.S. Cl.
CPC .............. *C09K 8/46* (2013.01); *C04B 14/465* (2013.01); *C04B 24/04* (2013.01); *C04B 24/121* (2013.01); *C04B 24/287* (2013.01); *C04B 28/04* (2013.01); *C08F 283/04* (2013.01); *C09K 8/467* (2013.01); *E21B 43/16* (2013.01); *C04B 2103/0062* (2013.01)

(58) Field of Classification Search
CPC .......... C09K 8/46; C09K 8/467; C04B 24/04; C04B 2103/0062; C04B 14/465; C04B 24/121; C04B 24/287; C04B 28/04; C08F 283/04; E21B 43/16; E21B 43/26
See application file for complete search history.

(56) References Cited

U.S. PATENT DOCUMENTS 3,511,314 A 5/1970 Scott et al.
3,623,330 A 11/1971 Nakade et al.
(Continued)

FOREIGN PATENT DOCUMENTS

GB 1229689 4/1971
WO WO2014204677 A1 12/2014

OTHER PUBLICATIONS

International Search Report and Written Opinion for related PCT application PCT/US2017/052367 dated Jan. 9, 2018.
(Continued)

*Primary Examiner* — Silvana C Runyan
(74) *Attorney, Agent, or Firm* — Bracewell LLP; Constance R. Rhebergen

(57) ABSTRACT

A wellbore cement composition that includes a cross-linked polyamide. The polyamide is formed by reacting a di-functional amine with an aromatic tri-functional carboxylic acid. The wellbore cement composition is created by blending cement and water with the polyamide and then allowed to cure. Increases in compressive strength, Young's Modulus, and Poisson's Ratio of the cement are realized by adding the polyamide to the cement composition.

12 Claims, 9 Drawing Sheets

Related U.S. Application Data

(60) Provisional application No. 62/397,126, filed on Sep. 20, 2016.

(51) Int. Cl.

| | |
|---|---|
| *C04B 28/04* | (2006.01) |
| *C09K 8/467* | (2006.01) |
| *C04B 14/46* | (2006.01) |
| *C04B 24/04* | (2006.01) |
| *C04B 24/12* | (2006.01) |
| *C04B 24/28* | (2006.01) |
| *C08F 283/04* | (2006.01) |
| *C04B 103/00* | (2006.01) |

(56) References Cited

U.S. PATENT DOCUMENTS

| | | |
|---|---|---|
| 4,107,292 A | 8/1978 | Nemeth |
| 4,324,683 A | 4/1982 | Lim et al. |
| 4,632,186 A | 12/1986 | Boncan et al. |
| 5,049,167 A | 9/1991 | Castro et al. |
| 5,095,987 A | 3/1992 | Weaver et al. |
| 5,211,234 A | 5/1993 | Floyd |
| 5,368,102 A | 11/1994 | Dewprashad et al. |
| 5,437,813 A | 8/1995 | Akashi et al. |
| 5,705,233 A | 1/1998 | Denes et al. |
| 6,645,288 B1 | 11/2003 | Dargaud et al. |
| 6,786,963 B2 | 9/2004 | Matherly et al. |
| 7,476,713 B2 * | 1/2009 | Hild .................... C08K 5/0083 525/360 |
| 7,569,630 B2 * | 8/2009 | Ma ...................... C08K 5/0083 524/217 |
| 7,914,884 B2 | 3/2011 | Royer et al. |
| 8,251,143 B2 | 8/2012 | Drochon et al. |
| 8,383,031 B2 | 2/2013 | Naji et al. |
| 8,689,873 B2 | 4/2014 | Abad et al. |
| 10,065,887 B2 | 9/2018 | Kierat et al. |
| 2005/0203226 A1 | 9/2005 | Mader et al. |
| 2006/0119926 A1 * | 6/2006 | Liu .......................... B01J 13/10 359/296 |
| 2006/0144300 A1 | 7/2006 | Touzet et al. |
| 2007/0209794 A1 * | 9/2007 | Kaufman ................ C09K 8/50 166/276 |
| 2009/0062452 A1 | 3/2009 | Harder et al. |
| 2010/0025039 A1 | 2/2010 | Roddy et al. |
| 2011/0086941 A1 | 4/2011 | Therond et al. |
| 2011/0226690 A1 | 9/2011 | Kalayci |
| 2013/0295378 A1 | 11/2013 | Bonin et al. |
| 2015/0099674 A1 | 4/2015 | Lee et al. |
| 2015/0129207 A1 | 5/2015 | Bastuba et al. |
| 2018/0258336 A1 | 9/2018 | Contreras |

OTHER PUBLICATIONS

The International Search Report and Written Opinion for related PCT application PCT/US2018/066996 dated Mar. 22, 2019.

Song et al., "Recent progress in interfacial polymerization", Materials Chemistry Frontiers, 2017, pp. 1028-1040, vol. 1, No. 6, The Royal Society of Chemistry and the Chinese Chemical Society.

* cited by examiner

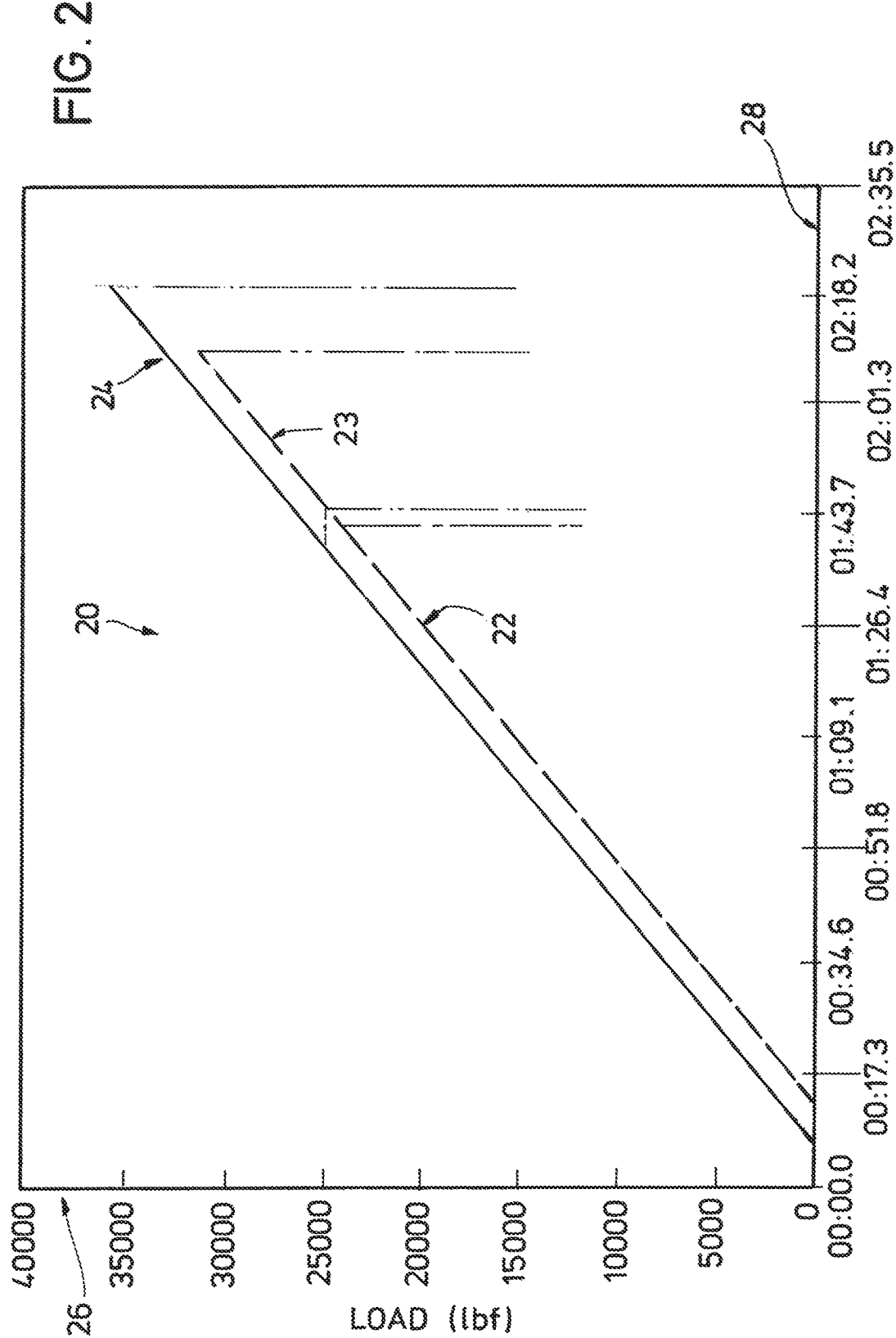

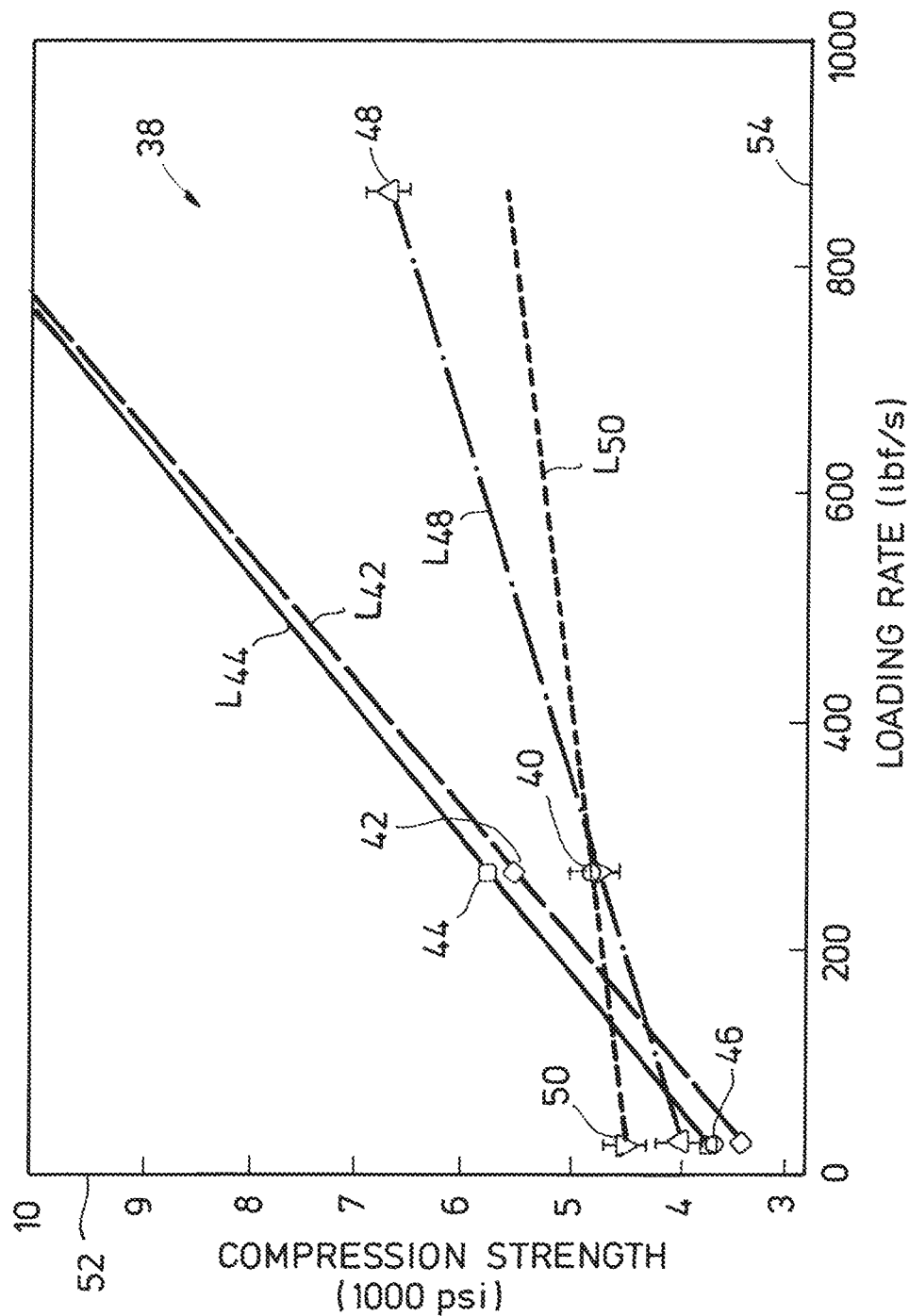

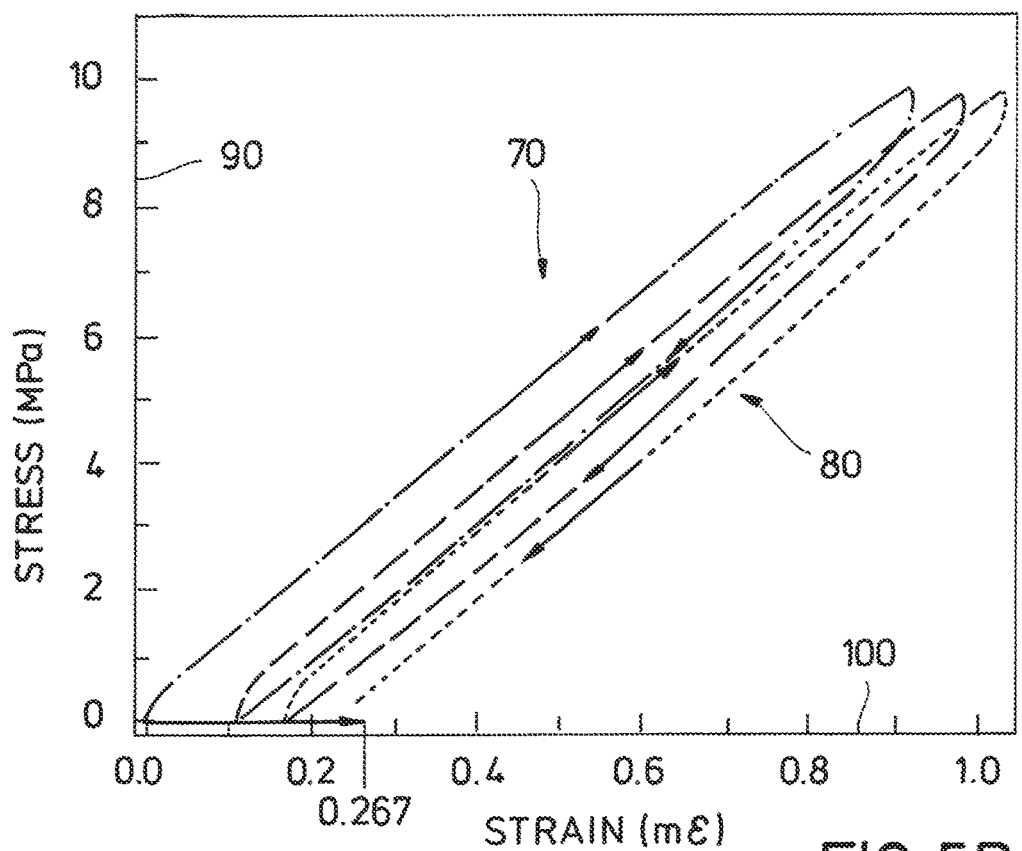
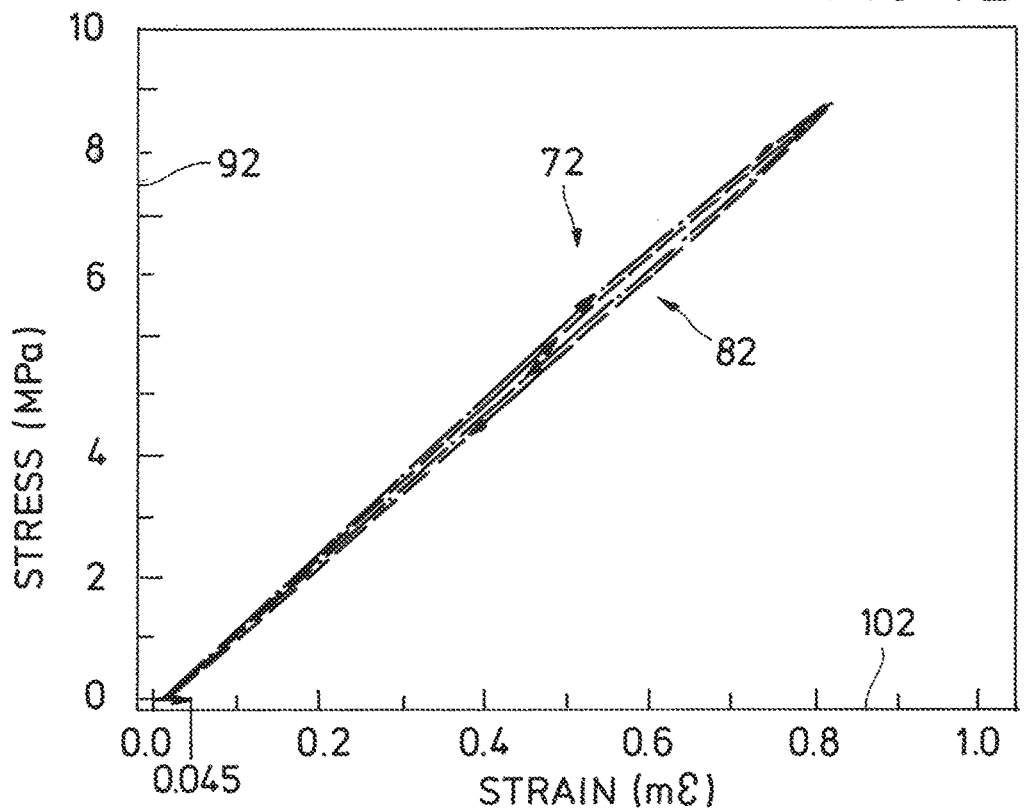

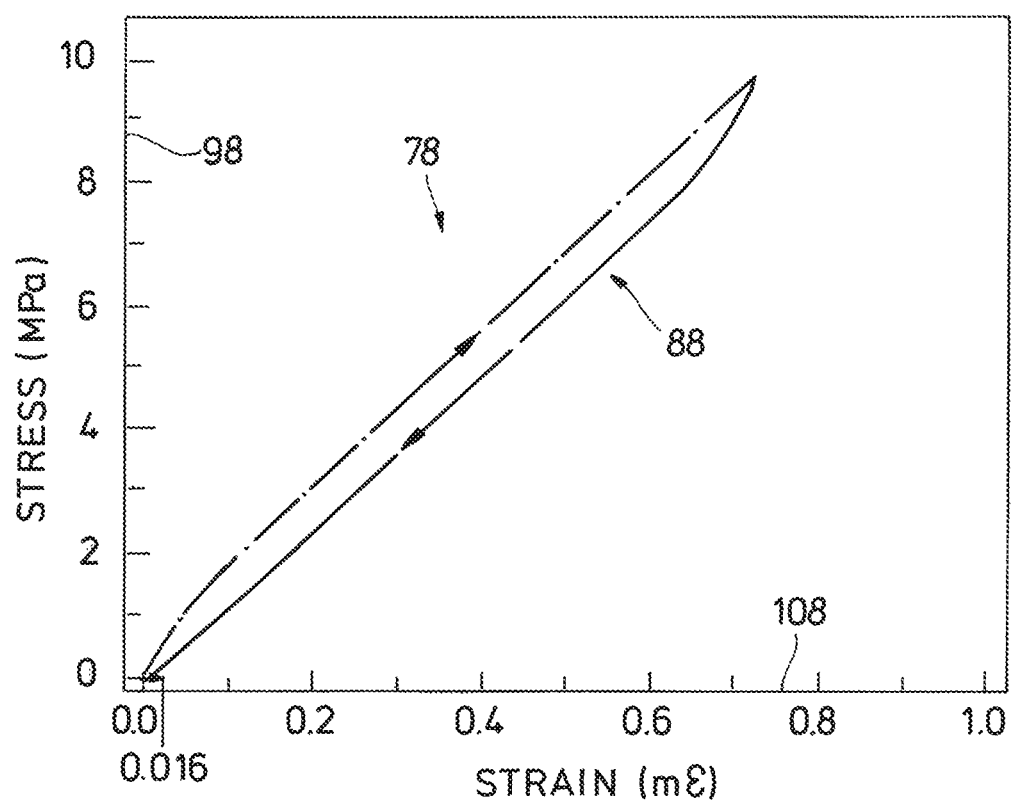

CEMENT HAVING CROSS-LINKED PLYMERS

CROSS-REFERENCE TO RELATED APPLICATION

This application is a division of and claims priority to and the benefit of co-pending U.S. patent application Ser. No. 15/701,670 filed Sep. 12, 2017, which claimed priority from U.S. Provisional Application Ser. No. 62/397,126 filed Sep. 20, 2016, the full disclosures of which are incorporated by reference in their entirety and for all purposes.

BACKGROUND

1. Field

The present disclosure relates to a cement that bonds casing to a wellbore. More specifically, the present disclosure relates to a cement that bonds casing to a wellbore, and that includes cross-linked polymers.

2. Related Art

Hydrocarbons that are produced from subterranean formations typically flow from the formations to surface via wellbores drilled from surface that intersect the formations. Most wellbores are lined with casing and strings of production tubing inserted within the casing that are for conveying the hydrocarbons to surface. The casing is usually bonded to the inner surface of the wellbore with a cement that is injected into an annulus that is between the casing and wellbore. In addition to anchoring the casing within the wellbore, the cement also isolates adjacent zones within the formation from one another. Without the cement isolating these adjacent zones fluids from the different zones, which are sometimes different, could become mixed in the annular space between the casing and wellbore wall. When one of the different fluids is water, separating it from the hydrocarbon is required. Further, if the water producing zone is at a pressure exceeding that of a hydrocarbon producing zone, water sometimes migrates into the hydrocarbon producing zone to thereby reduce the hydrocarbon producing potential of the wellbore.

The cement also prevents hydrocarbon fluid from flowing uphole from a hydrocarbon producing zone to the surface and in the annulus between the casing and the wellbore wall. Without the cement, or in instances when cement has failed, hydrocarbons are known to migrate to surface and then present a safety hazard to operations personnel. One problematic area for gas migration exists for deep wells, where fluid densities often as high as 22 pounds per gallon are used to control gas or formation fluid influx. To control gas migration, cement densities for successfully cementing of the zone of interest are sometimes as high as 22.7 pounds per gallon. As a cement slurry sets, hydrostatic pressure is reduced on the formation. During this transition, reservoir gases can travel up through the cement column resulting in gas being present at the surface. The permeable channels from which the gas flows cause operational and safety problems at the well site. Causes of gas channeling include: (1) bad mud/spacer/cement design that allows passage of water and gas resulting in failures in cementing operations; (2) high fluid loss from cement slurries, which causes water accumulation and results in micro-fractures within the cement body; and (3) cements not providing sufficient hydrostatic pressure to control the high pressure formation.

SUMMARY

Disclosed is an example of a cement composition for use in a wellbore and that includes a cement, a calcium silicate in the cement, and a polyaramide condensate compound that is cross-linked and formed from a trifunctional carboxylic acid and a diamine. Example of the diamine include ethylenediamine, 1,3-diaminobenzene, 1,4-diaminobenzene, 1,6-diaminohexane, 1,4-phenylenediamine, and combinations. Alternatively, the 1,6-diaminohexane is mixed with sebacoyl chloride. In one example, the trifunctional carboxylic acid is 1,3,5-benzenetricarboxylic acid chloride. In an embodiment, the polyaramide includes poly(ethylene trimesoylamide), poly-(meta-phenylene trimesoylamide), poly-(para-phenylene trimesoylamide), poly(hexamethylene trimesoylamide), poly(hexamethylene-co-sebacoyl trimesoylamide), poly-(para-phenylene trimesoylamide), a blend of poly-(meta-phenylene trimesoylamide) and poly (hexamethylene trimesoylamide), and combinations. In one example, the blend of poly-(meta-phenylene trimesoylamide) and poly(hexamethylene trimesoylamide) is a 1:1 ratio. Optionally, the polyaramide condensate is about 3% by weight of the cement.

Another example of a cement composition for use in a wellbore is disclosed and that includes a cement, and a polyamide compound that is cross-linked and formed from an aromatic triacid chloride and an amine. In one example, the polyamide has a molecular weight ranging from about 189 Daltons to about 555 Daltons. In an example, the cement includes a silica such as crystalline silica or calcium silicate. Alternatives exist where the amine includes a diamine such as one or more of ethylenediamine, 1,3-diaminobenzene, 1,4-diaminobenzene, 1,6-diaminohexane, 1,4-phenylenediamine, and combinations. In one alternative the triacid chloride is 1,3,5-benzenetricarboxylic acid chloride. The amine optionally is 1,6-diaminohexane and is mixed with sebacoyl chloride. In one embodiment, the polyamide compound is provided in an amount that ranges from about 1% by weight of the cement to about 6% by weight of the cement.

BRIEF DESCRIPTION OF DRAWINGS

Some of the features and benefits of the present disclosure having been stated, others will become apparent as the description proceeds when taken in conjunction with the accompanying drawings, in which:

FIG. 2 is a graph having plots reflecting compressive loads applied to cement samples versus time.

FIG. 4 is a graph having plots of compression strength of cement samples versus a loading rate.

Figure 1:
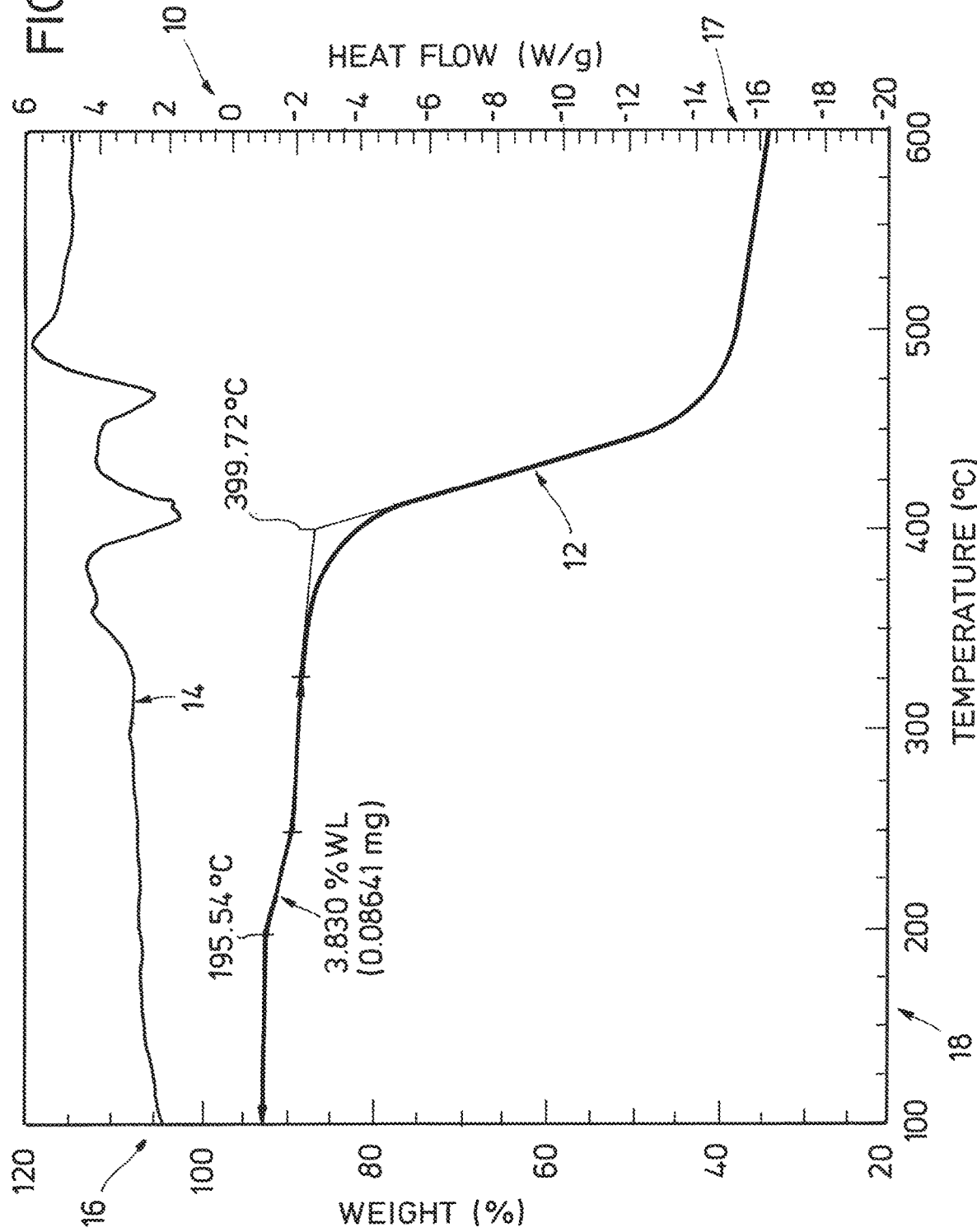
FIG. 1 is a graph of weight loss percent versus temperature of a cross linked polyamide as disclosed here.

It will be understood that the advantages of the present disclosure are not limited to the embodiments presented. On the contrary, the present disclosure covers all alternatives, modifications, and equivalents, as may be included within the spirit and scope of the present disclosure.

DETAILED DESCRIPTION

The method and system of the present disclosure will now be described more fully with reference to the accompanying drawings in which embodiments are shown. The method and system of the present disclosure may be in many different forms and should not be construed as limited to the illustrated embodiments set forth here; rather, these embodiments are provided so that this disclosure will be thorough and complete, and will fully convey its scope to those skilled in the art. Like numbers refer to like elements throughout. In an embodiment, usage of the term "about" includes +/−5% of the cited magnitude. In an embodiment, usage of the term "substantially" includes +/−5% of the cited magnitude.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of imitation. Examples in this disclosure are given for the purpose of illustrating embodiments of the present disclosure. However, it is to be understood that these examples are merely illustrative in nature, and that the process embodiments of the present disclosure are not necessarily limited to the examples.

Described is an example of a cement composition that is used in a wellbore for bonding a tubular to sidewalls of the wellbore; and that blocks axial flow in an annulus between the tubular and the wellbore sidewalls. Blocking flow through the annulus isolates vertically spaced apart portions of the formation from one another. In an embodiment, the cement composition includes a polymer. An example of the composition having the polymer experienced a 25% increase in compressive strength over that of compositions having latex.

In an example embodiment, the cement composition includes a mixture of cement, water, and polymer. An optional anti-foaming agent can be included in the mixture. In an embodiment where the cement is a Portland cement, the cement includes tri-calcium silicate ($C_3S$) and di-calcium silicate ($C_2S$). When mixed with water, both $C_3S$ and $C_2S$ can hydrate to form calcium silicate hydrate (C—S—H) gel. Further, in one example embodiment, the polymer is a cross-linked polymer. In another example embodiment, the polymer is a polyamide, and can be a cross-linked polyamide. Yet further optionally, the polymer is a polyaramide; examples exist where the polyaramide is a cross-linked polyamide. In one embodiment the polyamide is formed by a condensation reaction. In an optional example, the condensation reaction is between monomers. Examples exist where the polyamide is aliphatic, and examples exist where the polyamide is aromatic. In an example, the polymer was produced using a monomer that mimics the flexibility of a nylon using a long carbon-chain monomer, and the rigidity and strength of a polyaramide using an aromatic monomer. In an alternative, the polymer(s) are synthesized by reacting a trifunctional monomer with a bifunctional monomer. In an embodiment, polymer(s), polyamide(s), and/or polyaramide(s) products are linear, branched, or networked. Alternatives exist where the polymer(s), polyamide(s), and/or polyaramide(s) condensates are formed using a trifunctional monomer, which for the purposes of discussion here is referred to as a crosslinker; accordingly, such formed products are correspondingly referred to as being crosslinked.

Example 1

In one non-limiting example, a polyamide was prepared by condensation of an aromatic tri-acid chloride with diamine at room temperature by interfacial polymerization. 1,3,5-benzenetricarboxylic acid chloride, trimesic acid trichloride, and trimesoyl chloride are examples of a tri-acid chloride. The diamine was dissolved in water or ethanol and added to a chloroform-cyclohexane solution containing an equal stoichiometric amount of the tri-acid chloride; an emulsifier was also added. Example diamines include ethylenediamine, 1,3-diaminobenzene, 1,4-diaminobenzene, 1,6-diaminohexane, 1,6-diaminohexane (mixed with sebacoyl chloride), and 1,4-phenylenediamine. In an embodiment, carboxylic acid is used in lieu of the tri-acid chloride.

Example 2

The reaction of 1,3,5-benzenetricarboxylic acid chloride with ethylenediamine and having a molar ratio of 2:3, which produces Polymer A is provided in Equation 1 below.

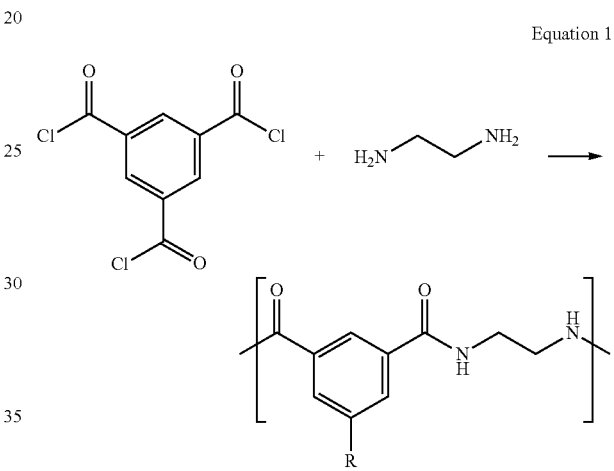

Equation 1

The molecular weight of Polymer A is 189 Daltons.

Example 3

The reaction of 1,3,5-benzenetricarboxylic acid chloride with 1,3-diaminobenzene and having a molar ratio of 2:3, which produces Polymer B, is provided in Equation 2 below.

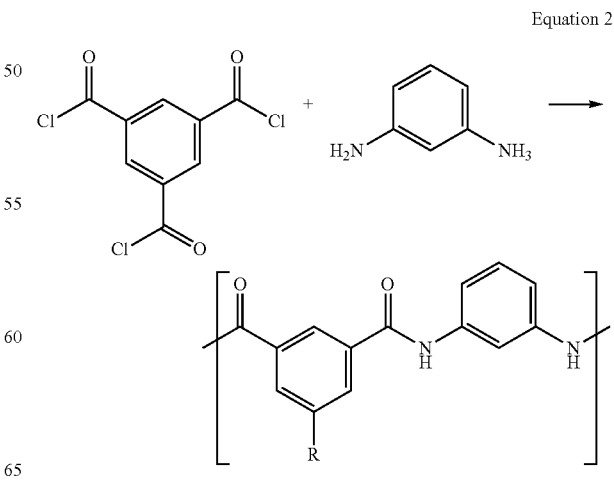

Equation 2

The molecular weight of Polymer B is 265 Daltons.

Example 4

The reaction of 1,3,5-benzenetricarboxylic acid chloride with 1,4-diaminobenzene and having a molar ratio of 2:3, which produces Polymer C, is provided in Equation 3 below.

Equation 3

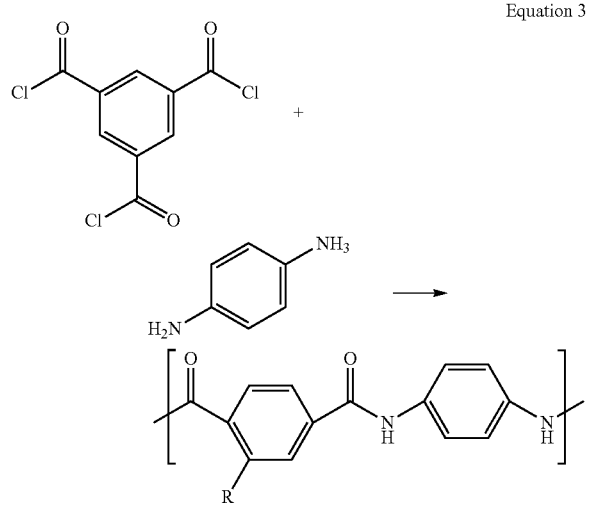

The molecular weight of Polymer C is 265 Daltons.

Example 5

The reaction of 1,3,5-benzenetricarboxylic acid chloride with 1,6-diaminohexane and having a molar ratio of 2:3, which produces Polymer D, is provided in Equation 4 below.

Equation 4

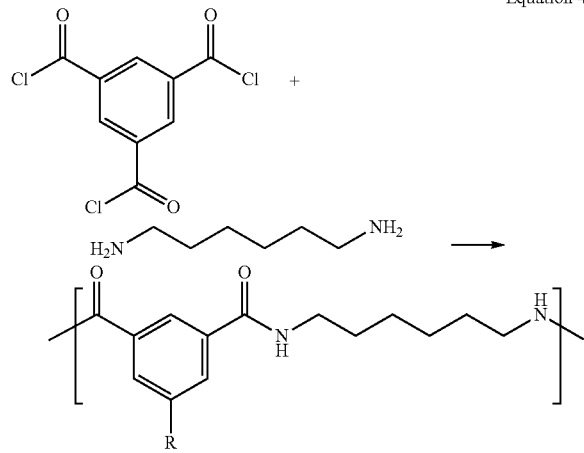

The molecular weight of Polymer D is 273 Daltons.

Example 6

The reaction of 1,3,5-benzenetricarboxylic acid chloride with 1,6-diaminohexane mixed with sebacoyl chloride and having a molar ratio of 1:3:1, which produces Polymer E, is provided in Equation 5 below.

Equation 5

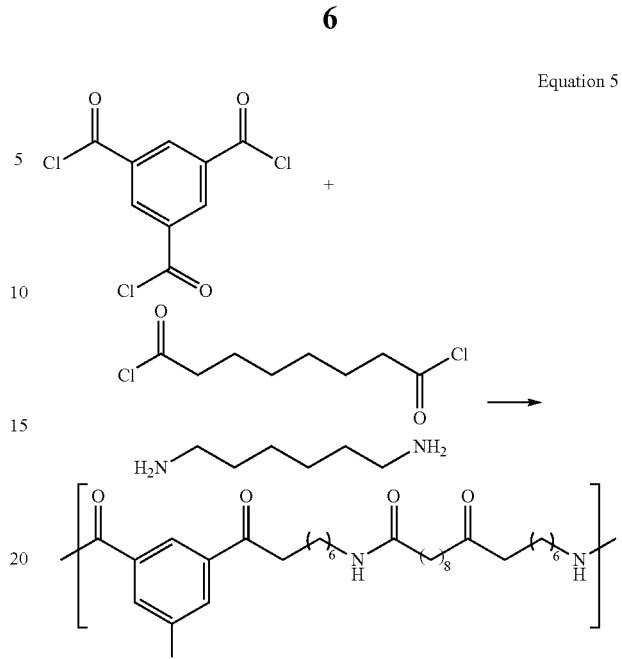

The molecular weight of Polymer E is 555 Daltons.

Reactant ratios for forming Polymer A are not limited to that provided in Example 2 above. Alternative examples of producing Polymer A exist using amounts of 1,3,5-benzenetricarboxylic acid chloride in a range of from one to four and amounts of ethylenediamine in a range of two to six. Reactant ratios for forming Polymer B are not limited to that provided in Example 3 above. Alternative examples of producing Polymer B exist using amounts of 1,3,5-benzenetricarboxylic acid chloride in a range of from one to four and amounts of 1,3-diaminobenzene in a range of two to six. Reactant ratios for forming Polymer C are not limited to that provided in Example 4 above. Alternative examples of producing Polymer C exist using amounts of 1,3,5-benzenetricarboxylic acid chloride in a range of from one to four and amounts of 1,3-diaminobenzene in a range of two to six. Reactant ratios for forming Polymer D are not limited to that provided in Example 5 above. Alternative examples of producing Polymer D exist using amounts of 1,3,5-benzenetricarboxylic acid chloride in a range of from one to four and amounts of 1,6-diaminohexane in a range of two to six. Reactant ratios for forming Polymer E are not limited to that provided in Example 6 above. Alternative examples of producing Polymer E exist using amounts of 1,3,5-benzenetricarboxylic acid chloride in a range of from one to four, amounts of 1,6-diaminohexane in a range of two to six, and amounts of sebacoyl chloride in a range of from one to four.

Example 7

In a non-limiting example of use, an organic phase of 750 milliliters (ml) mixture of a 4:1 ratio of cyclohexane to $CHCl_3$ and two percent by volume of Span 85 is added to a 2 liter two-neck round bottom flask and stirred at 600 revolutions per minute (rpm) using a Caframo® BDC 2002 overhead stirrer. An aqueous solution of 200 ml of the diamines (1,6-diaminohexane, 1,4-diaminobenzene, 1,3-diaminobenzene, and ethylenediamine) is added to form an emulsion, which is stirred for 30 minutes. In preparation of interfacial polymerization, a solution of 26.5 grams of cross-linker 1,3,5-benzenetricarboxylic acid chloride dissolved in 200 ml of chloroform/CHCl₃ was added to the emulsion at a rate of 1 ml/minute, and the resulting solution was stirred for 1-2 hours. Advantageously, no heating was applied to the reactants during polymerization or during stirring. The resulting polymer was allowed to settle, and then decanted and washed with 500 ml of diethyl ether, 500 ml of tetrahydrofuran, and 500 ml of ethanol. The polymer was then transferred to a 250 ml round bottom flask, where it was concentrated by rotary evaporation and dried at temperature of 180 Fahrenheit (° F.) until a constant weight of free flowing powder was achieved. The bands of the infrared spectrum of 1,3-diaminobenzene and 1,4-diaminobenzene were measured after each condensation reaction.

In a non-limiting prophetic example a polymer is produced using the following constituents: 25.3 percent by weight of chloroform (solvent), 52.9 percent by weight of cyclohexane (continuous phase), 1.4 percent by weight of 1-6 diaminohexane, 2.4 percent by weight of 1,3,5-benzenetricarboxylic acid chloride, 0.1 percent by weight of surfactant, and 17.9 percent by weight of water (dispersed phase). The cyclohexane, chloroform, and surfactant are combined in a first mixing tank (not shown), and then seventy-five percent by volume of this solution is transferred to a reactor (not shown). In a second mixing tank (not shown), the 1-6 diaminohexane is dissolved in water and then added to the reactor to form an emulsion. In a third mixing tank (not shown) the 1,3,5-benzenetricarboxylic acid chloride is dissolved in the remaining twenty-five percent of the cyclohexane, chloroform, and surfactant mixture. The contents of the third mixing tank are added to the reactor at a constant rate to polymerize the emulsion; a byproduct of which is hydrochloric acid gas. The reactor contents are stirred for 24 hours for homogeneity. The polymer will settle in the reactor, and takes the form of a powder by removing the solvents and drying the polymer.

In an example, Polymer A is referred to as poly(ethylene trimesoylamide), Polymer B is referred to as poly-(metaphenylene trimesoylamide), Polymer C is referred to as poly-(para-phenylene trimesoylamide), Polymer D is referred to as poly(hexamethylene trimesoylamide) (or crosslinked-"PA6T"-trimesoylamide), and Polymer E is referred to as poly(hexamethylene-co-sebacoyl trimesoylamide) (crosslinked-"nylon610"-trimesoylamide). Embodiments exist where Polymers A-E are formed in accordance with Example 1 above, and in an alternative, embodiments exist where Polymers A-E are formed in accordance with Example 7 above.

In one alternative, the polymer solution was stirred for 24 hours for homogeneity. A free-flowing powder was obtained by decanting, rotary evaporation, and filtration. Then, the polymer was further dried in an oven at 180° F. overnight or until a constant weight was achieved. To measure the heat resistance of the crosslinked polyaramide, a thermogravimetric analysis (TGA) technique was used to continuously measure the weight of a sample as a function of temperature (Q600 TGA, TA Instruments). High heat resistance is a characteristic of polyaramides.

Example 8

In one non-limiting example, a cement was prepared having a polymer. Example polymers for this example include Polymers A-E, a 1:1 blend of Polymers B and D, and combinations. A cement slurry was formed having four components: water, cement, 3% by weight of cement of the polymer applied, and anti-foamer. Optionally, the amount of polymer in the slurry can range from about 0.5% by weight of cement ("bwoc") to about 5% bwoc. This range may be doubled and increased for more favorable results. Here, a 600-mL cement slurry with defoamer and polymer was prepared, where 24.2 grams of the polymer added to 806.9 grams of cement and 340.2 grams of water to make a 16.0 pound per gallon (ppg) cement. Any type of cement can be used in the cement slurry, including all Portland cements, any type of cement as classified by the American Society for Testing and Materials (ASTM), such as Type I, II, II, or V, any type of cement as classified by the American Petroleum Institute (API), such as Class A, C, G, or H, cements where latexes has been applied, white, pozzolana, and the like. Portland cements are described in API specification for "Materials and Testing for Well Cements", API 10B-2 of the American Petroleum Institute. Embodiments exist having no additional chemical additives. Following API standards the slurry was blended at a mixing rate of 4,000 revolutions per minute (rpm) for 14 seconds (s) and then increased to 12,000 rpm for 35 s. After mixing, the slurry was then poured into cube molds (2 cubic inches) or cylinder molds (2-inch diameter by 4-inch height). The samples were then placed into a curing chamber, where the cement remained for 72 hours at conditions of 180 degrees ° F. and 3,000 pounds per square inch (psi). After curing, the cement was removed from the curing chamber and the sample surface prepared to measure its mechanical properties, such as compression strength.

Example 9

In a non-limiting example of forming a neat cement, 782.2 grams of Saudi G cement was mixed with 348.9 grams of water, which produced a slurry with a volume of 600 milliliters and a density of 15.8 pounds per gallon (ppg). The slurry was blended at 4,000 rpm for 15 s and blended at 12,000 rpm for 35 s, and poured into a brass mold. Inside the mold the cement was cured at 180° F. for 72 hours, and at a pressure of 3000 psi. The ends of the samples were planed after curing so that surfaces of the samples were parallel. Examples of the cement are listed in Example 7 above.

Example 10

In a non-limiting example of use, a cement was prepared having 789.2 grams of Saudi G cement, 348.9 grams of water, and 23.7 grams (3% by weight of cement) of one of Polymers A-E, a 1:1 blend of Polymers B and D, and combinations. A 600-mL cement slurry as prepared having a density of 15.8 ppg. The slurry was blended at 4,000 rpm for 15 s, then blended at 12,000 rpm for 35 s, and poured into a brass mold. Inside the mold the cement was cured at 180° F. for 72 hours, and at a pressure of 3000 psi. The ends of the samples were planed after curing so that surfaces of the samples were parallel. Examples of the cement are listed in Example 7 above.

Example 11

In a non-limiting example of use, a cement for prepared having 789.2 grams of Saudi G cement, 294.4 grams of water, 47.4 grams of a 50% latex solution (6% bwoc), and 7.1 grams of a stabilizer (15% by weight of the latex). Latex candidates include carboxylated latexes, and carboxylated styrene-butadiene latexes. The slurry was blended at 4,000 rpm for 15 seconds and blended at 12,000 rpm for 35 seconds, and poured into a brass mold. Inside the mold the cement was cured at 180° F. for 72 hours, and at a pressure of 3000 psi. The ends of the samples were planed after curing so that surfaces of the samples were parallel. Examples of the cement are listed in Example 7 above.

Analysis of the polyamide synthesized from Equation 2 above demonstrated a material with a high temperature resistance up to 400° Celsius (° C.), and with weight loss of less than 4% at 195° C. In contrast, styrene-butadiene rubber (SBR) latexes have recommended maximum operating temperatures of 82° C. to 100° C. Shown in graphical form in FIG. 1 is an example of a graph 10 reflecting data obtained by analyzing the polyamide synthesized in Example 4. Graph 10 includes a line 12 that represents weight loss data and which was obtained by thermogravimetric analysis. Another line 14 is included with graph 10 and that represents data obtained using a differential scanning calorimetry. Values for weight percent are shown scaled along a left hand ordinate 16, values for heat flow (W/g) are scaled along a right hand ordinate 17, and an abscissa 18 provides a scale for temperature (° C.). Line 12, thus illustrates percent weight loss of the Equation 2 polyamide with respect to temperature, and shows that the polyamide percent weight loss remains substantially linear up to around 400° C., where it begins to decompose. SBR latexes on the other hand have a manufacturer's temperature recommendation of around 82° C. to about 100° C.

Additional increases in performance of the polymer cement described here included an increase in compression strength. For example, a percent (%) increase in mechanical property (x) is calculated as [1−(x for control cement)/(x for polymer cement)]*100. An increase in compression strength demonstrates the beneficial effects from crosslinked polyaramide application. Referring now to FIG. 2, shown is a graph 20 comparing the respective compressive strengths of neat, polyamide, and latex cements. A series of data points 22, 23, 24 on graph 20 respectively reflect measured compressive strengths over time of a latex based cement, a polyamide based cement (made with the 1,6-diaminohexane monomer), and a neat cement. Samples of the cements were loaded over time, thus values of load in pounds-force ("lbf") are scaled along the ordinate 26 of graph 20, and values of time in seconds are scaled along the abscissa 28 of graph 20. A maximum compression strength of 25,667 lbf was measured for the latex based cements. Whereas the polyamide cement samples prepared in accordance with the present disclosure were tested and measured to have a maximum compression strength of over 34,167 lbf. The maximum compression strength of the neat cement approached 38,000 lbf.

Figure 3A:
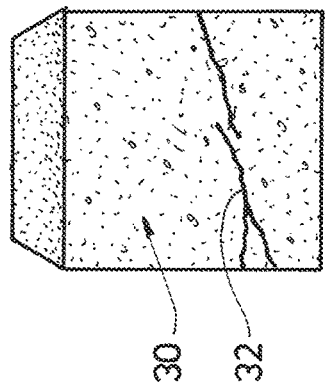
FIGS. 3A-3C are perspective views of the cement samples loaded to obtain the data presented in FIG. 2.
Figure 3B:
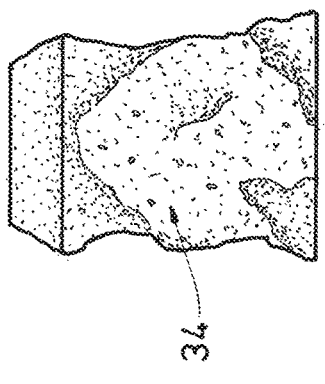
Figure 3C:
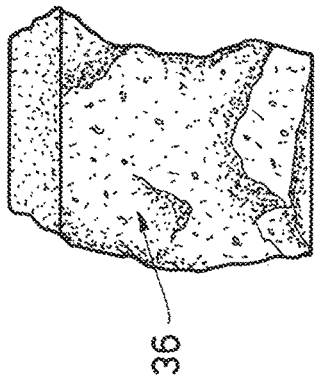

FIGS. 3A-3C illustrate different cement blocks that underwent the compressive testing illustrated in FIG. 2. Shown in perspective view in FIG. 3A is an example of a sample 30 formed from cement made having an amount of polyamide, such as one or more of Polymers A-E discussed above. While the compressive testing formed a crack 32 in sample 30, the sample 30 otherwise remained substantially intact. FIG. 3B shows in a perspective view an example of a sample 34 made from a latex-cement, and FIG. 3C is a perspective view of a sample 36 made from neat cement and having no additives. Samples 34, 36 were each subjected to compressive loading, but instead of remaining substantially intact like the sample 30 of FIG. 3A, both samples 34, 36 crumbled. The latex-cement (or latex based cement) was made by adding about 3% by weight of latex to cement. Neat cement was made by mixing cement, water, and an antifoaming agent.

FIG. 4 is a graph 38 of data obtained by measuring the compression strength of cement samples, while loading the cement samples at loading rates of 27 lbf/s, 267 lbf/s, and 865 lbf/s. The cement samples included samples having the polyamides made in accordance with Equations 1-4 above, a neat cement, and a latex based cement. Data points 40, 42, 44, 46, 48, and 50 are shown on the graph 38. The ordinate 52 of graph 38 is scaled to reflect compression strength in one thousand pounds per square inch and the abscissa 54 is scaled to the loading rate (lbf/s). Data point 40, represents the measured compression strength of the cement having the polyamide of Equation 1 above. Data point 42, represents the measured compression strength of the cement having the polyamide of Equation 2 above; data point 44, represents the measured compression strength of the cement having the polyamide of Equation 3 above; and data point 46, represents the measured compression strength of the cement having the polyamide of Equation 4 above. Data points 48, 50 reflect measured compression strength respectively of a neat cement and latex based cement. The neat cement and latex based cement that were tested were made in the same way as the neat cement and latex based cement tested and illustrated in FIGS. 3B and 3C.

As shown in FIG. 4, data point 40, which is a single data point, shows a loading rate of 287 lbf/s and a compression strength of around 4500 psi. Data points 42 reflect compression strengths of around 3500 psi at a loading rate of 27 lbf/s, and a compression strength of around 5600 for a loading rate of 287 lbf/s. Line $L_{42}$ is shown connecting the two data points 42. Data points 44 reflect compression strengths of around 3700 psi at a loading rate of 27 lbf/s, and a compression strength of around 5800 for a loading rate of 287 lbf/s. Line $L_{44}$ is shown connecting the two data points 44. Data point 46, which is also a single data point, shows a loading rate of 27 lbf/s with a corresponding compression strength of around 3700 psi. Data points 48 reflect compression strengths of around 4000 psi at a loading rate of 27 lbf/s, and a compression strength of around 6700 for a loading rate of 865 lbf/s. Line $L_{48}$ is shown connecting the two data points 48. Data points 50 reflect compression strengths of around 4500 psi at a loading rate of 27 lbf/s, and a compression strength of around 4800 for a loading rate of 287 lbf/s. Line $L_{50}$ is shown connecting the two data points 50. The cement samples having the polyamide of Equations 2 and 3 and having latex were not tested at the loading rate of 865 lbf/s, but how these samples would perform at that loading rate was estimated by extrapolating lines $L_{42}$, $L_{44}$, and $L_{50}$. The sample having the polyamide of Equation 1 was tested at a loading rate of 287 lb/s, and the sample having the polyamide of Equation 4 was tested at a loading rate of 27 lbf/s; as these produced single data points, no corresponding lines were formed. From FIG. 4 though it is clear that cement samples having polyamides have greater compression strengths at higher loading rates.

In a non-limiting example, static measurements and dynamic measurements were conducted on samples of neat cement, cement having latex, and on cement having some of the polyaramids of Examples 1-6 above. Static measurements were performed using a press (the NER Autolab 3000), which can obtain pressures up to 10,000 psi. The test equipment included an axial loading system, a confining pressure supply system, and data acquisition software. The samples measured were cylinders having a two inch diameter and a four inch length, and were jacketed and placed between steel end caps. Linear variable differential transformers (LVDTs) included with the press measured axial and radial deformation of the sample. The static measurements were taken at ambient temperature and a pressure of about 3000 psi. The sample was placed in a triaxial cell and pressurized to a confining pressure of 30 megapascals (MPa). Each cement sample was subjected to three axial load cycles. Plots of the loading cycles over time resemble triangular waveforms. In each loading series, an axially applied differential stress of 10 MPa was applied, and various peak axial stresses were applied. By applying uniaxial stress to the sample, its Young's modulus and Poisson's ratio were calculated based on strain measured by the LVDTs. Differences in failure mechanisms were identified for the different cement samples tested.

Dynamic measurements of the cement samples were performed with a Chandler MPRO instrument under confined conditions. The measurements were obtained at temperatures ranging from about 180° F. to about 350° F., and at a pressure of 3000 psi. The samples remained in the instrument after curing, and measurements were taken as the cement was setting. Here, incremental increases in temperature after 20 hours measured cement response to thermal changes and the effects on different mechanical properties.

Tables 1A-1C below contains ranges of values of compression strength in psi, Young's modulus in psi, and Poisson's ratio for the samples of cement containing polyaramid, samples of neat cement, and samples of latex cement.

TABLE 1A (Polyaramid Cement)

| | Compression Strength (psi) | Young's modulus (psi) | Poisson's Ratio |
|---|---|---|---|
| Static | 3000-5000 | $1.7 \times 10^6$-$2.2 \times 10^6$ | 0.23-0.33 |
| Dynamic | Variable | $1.6 \times 10^6$-$1.9 \times 10^6$ | 0.35-0.37 |

TABLE 1B (Neat)

| | Compression Strength (psi) | Young's modulus (psi) | Poisson's Ratio |
|---|---|---|---|
| Static | 5000-6500 | $2.0 \times 10^6$ | 0.2 |
| Dynamic | Variable | $1.4 \times 10^6$-$1.9 \times 10^6$ | 0.35-0.36 |

TABLE 1C (Latex Cement)

| | Compression Strength (psi) | Young's modulus (psi) | Poisson's Ratio |
|---|---|---|---|
| Static | 3000-5000 | $1.6 \times 10^6$-$1.9 \times 10^6$ | 0.25-0.35 |
| Dynamic | Variable | $1.4 \times 10^6$-$1.9 \times 10^6$ | 0.35-0.36 |

Figure 5C:
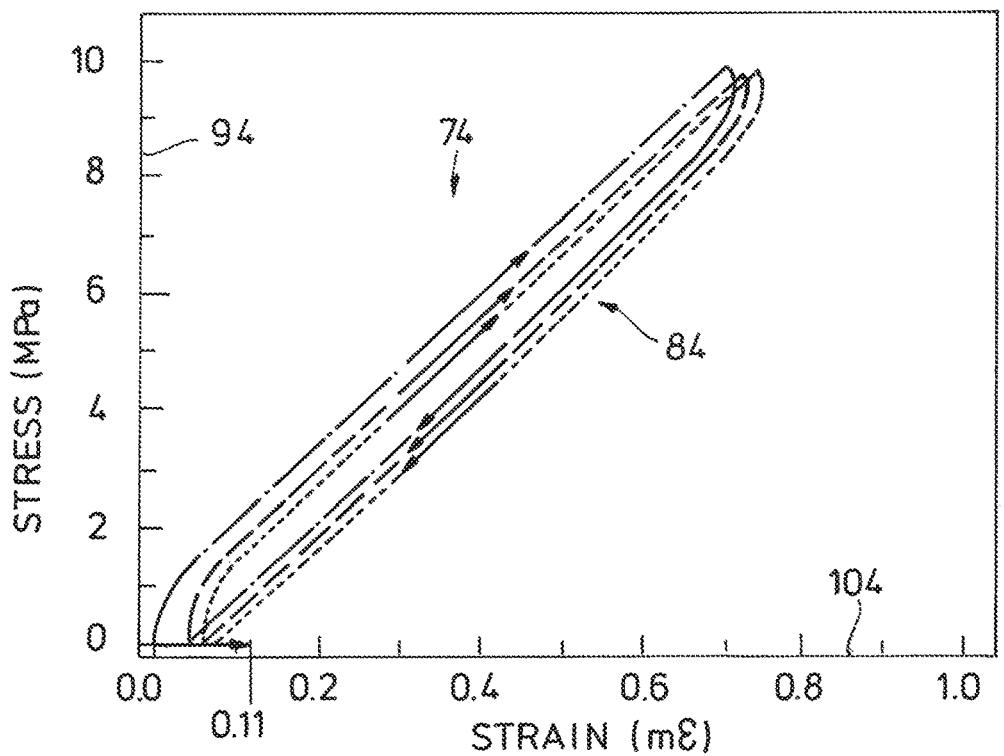
FIGS. 5A-SE are graphical illustrations of stress-strain data obtained by repeated loading of cement samples.
Figure 5D:
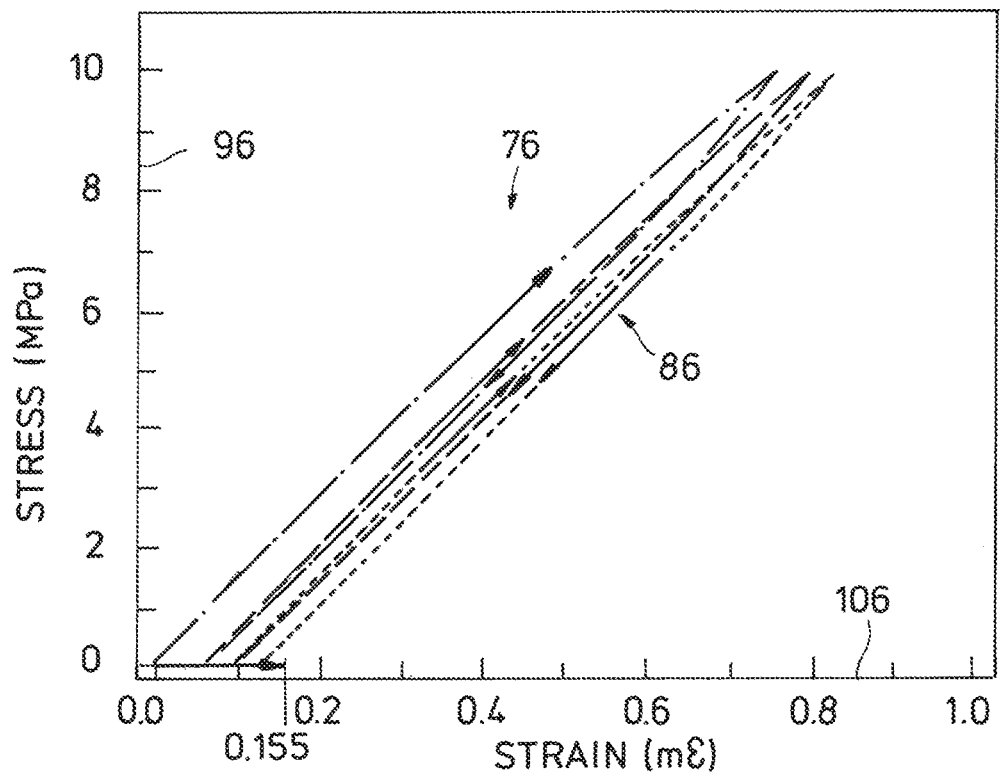

Graphs 70, 72, 74, 76, 78 are shown respectively in FIGS. 5A-5E that reflect applied stresses and thermal cycle responses of cements having the following respective additives: latex, Polymer D, Polymer B, Polymer C, and a 1:1 combination of Polymers D and B ("the tested cements"). Plots 80, 82, 84, 86, 88 are respectively illustrated on the graphs 70, 72, 74, 76, 78 that depict measured values of strain resulting from stressing these cements. Ordinates 90, 92, 94, 96, 98 on the graphs 70, 72, 74, 76, 78 are scaled to illustrate values of stress in MPa, and abscissas 100, 102, 104, 106, 108 on the graphs 70, 72, 74, 76, 78 are scaled to represent values of strain in millistrain (mE). The graphs 70, 72, 74, 76, 78 were generated using data obtained from a series of laboratory tests that cyclically loaded the tested cements, while at the same time triaxially compressing the tested cements. The resulting stresses experienced by the tested cements were recorded and compared to the applied stresses to examine fatigue behavior of the tested cements. Each of the tested cements experienced some degree of hysteresis, that is, the stress-strain relationship of the tested cements followed different paths under subsequent loading cycles. This is best seen in FIG. 5A, where cement sample being tested contains latex. Here as illustrated by plot 80, the latex cement sample experienced a permanent strain of 26.7% after the three loading cycles. As shown in FIGS. 5B-5E, tested cements containing the polymers experienced deformations that were significantly lower than that of the latex cement of FIG. 5A, and which were unexpected. More specifically, the cement sample containing Polymer D experienced a 4.5% permanent strain (FIG. 5B), the cement sample containing Polymer B experienced an 11% permanent strain, the cement sample containing Polymer C experienced a 15.5% permanent strain, and the cement sample containing a blend of Polymers B and D experienced a 1.6% permanent strain. Not to be confined to theory, but it is believed that the intermolecular interaction between the polymeric structure and the cement surface is strong due to the reactive amide group.

Figure 6A:
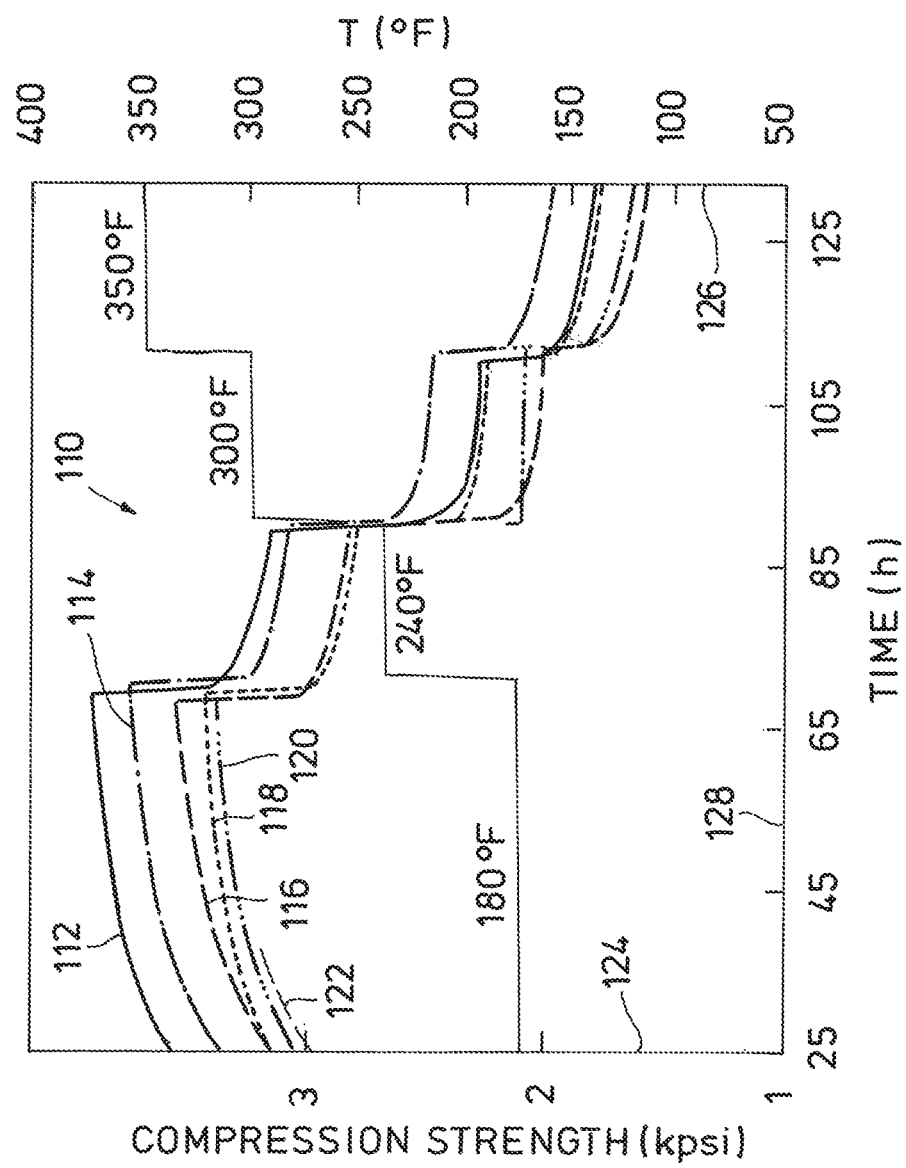
FIGS. 6A and 6B are graphical depictions respectively of compression strength and Young's modulus measured over time and at varying temperature of different cements.

Provided in FIG. 6A is a graph 110 containing plots 112, 114, 116, 118, 120, 122 that represent compression strength of various cements. Data obtained for plots 112, 114, 116, 118, 120, and 122 was respectively obtained by testing samples of neat cement, cement containing Polymer C, cement containing latex, cement containing Polymer B, cement containing Polymer D, and cement containing Polymer E. Units of the compression strength is in thousands of pounds per square inch (kpsi), and as reflected in FIG. 6A, the compression strength measurements were taken over a length of time and a range of temperatures. Values of compression strength are plotted along a left hand ordinate 124, values of temperature are plotted along a right hand ordinate 126, and values of time are plotted along abscissa 128. As illustrated in FIG. 6A, the temperature was 180° F. for 0 to about 70 hours, at 240° F. from about 70 hours to about 90 hours, at 300° F. from about 90 hours to about 115 hours, and 350° F. from about 115 hours to about 130 hours. The subsequent changes in temperature took place over a relatively short period of time and were generally instantaneous. As shown in the Example of FIG. 6A, compression strengths of every cement sample tested dropped at a substantial rate at each temperature increase. At temperatures equal to or greater than 240° F. the samples demonstrated a general reduction in magnitude over time, even when exposed to constant temperature. As illustrated by plot 114, the cement sample containing Polymer C possessed a compression strength having the largest magnitude at temperatures of 300° F. and greater, including neat cements and that having latex.

Figure 6B:
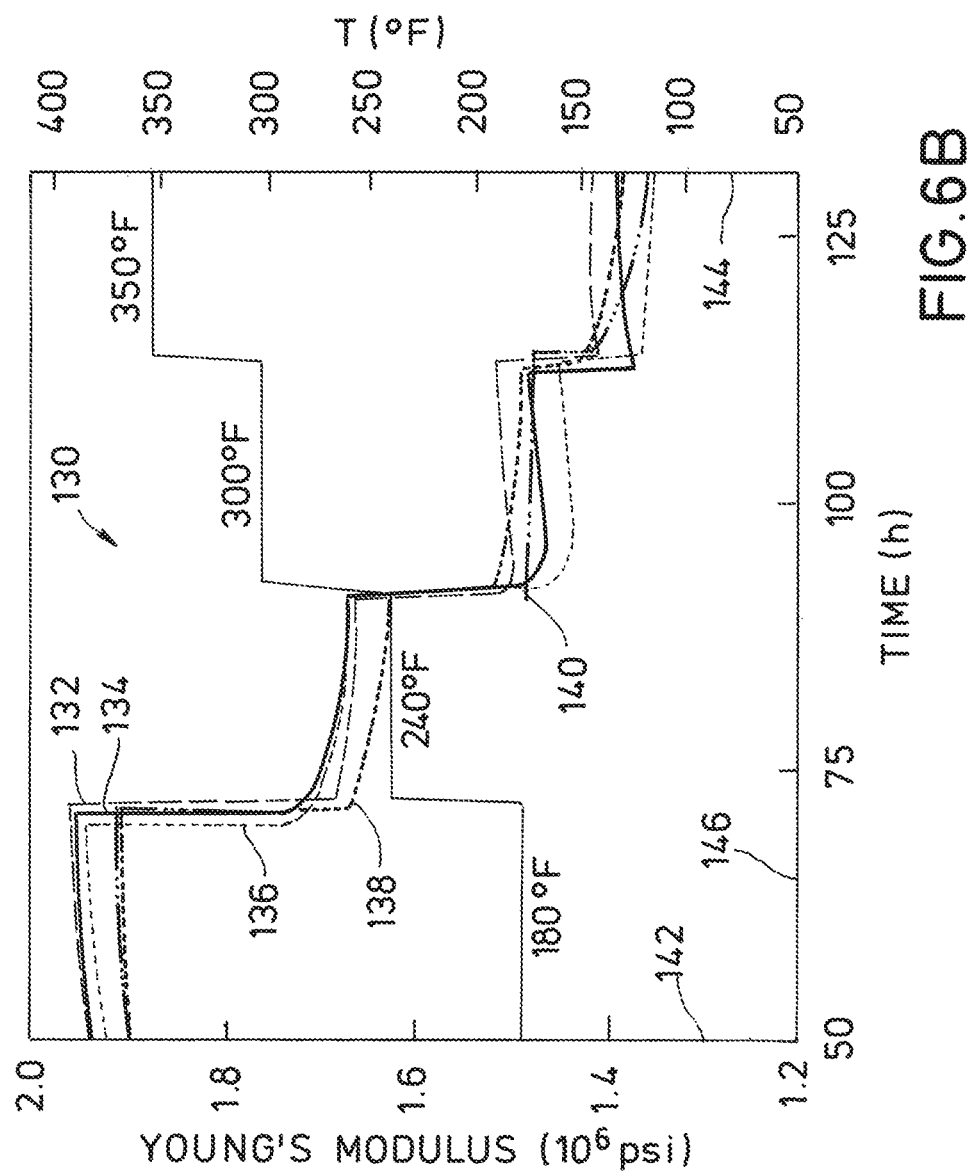

A graph 130 is shown in FIG. 6B having plots 132, 134, 136, 138, 140 that represent measured values of Young's modulus ($\times 10^6$ psi) of samples respectively made up of cement having Polymer C, neat cement, cement having latex, cement having Polymer B, and cement having Polymer D. Values of Young's modulus are plotted along a left hand ordinate 142, values of temperature are plotted along a right hand ordinate 144, and values of time are plotted along abscissa 144. The values of temperature and respective durations used to generate the plots 132, 234, 136, 138, 140 of FIG. 6B were substantially the same as that used to generate the data for FIG. 6A. Similar to the results of FIG. 6A, the measured Young's modulus of the cement samples experienced a significant rate of decrease with each increase in temperature. Further illustrated in FIG. 6B is that the measured Young's modulus for the sample having Polymer C (plot 132) was greater than that of the samples having neat cement (plot 134) and cement with latex (plot 136). Further values obtained for Polymer C that are over the varying ranges of temperatures, include values of transit and shear velocity times. Transit velocity values ranged between 7 and 8 microseconds per inch for temperatures of 180° F. to 350° F., and which generally increased with increasing temperature. Shear velocity times ranged from about 15 to about 18 microseconds per inch for temperatures of 180° F. to 350° F. Shear velocity values also increased with increasing temperature.

In one non-limiting example of use, combining the reactants to form the polyamide generates an emulsion of a dispersed phase and a continuous phase; where the diamines are contained in the dispersed phase, and the triacid chloride is in the continuous phase. Vesicles are formed by interfacial polymerization along interfaces between the dispersed and continuous phase, and are made up at least in part by the polyamide. Due to additional processing, or compression within the cement, the vesicles are ruptured to form spent capsules. Thus in an embodiment, at least some of the polyamide in the cement is in the form of spent capsules, which are generally non-spherical, and range in shape from a planar configuration, to those with a cross section that approximates an ellipse. In an alternative, the polyamide spent capsules have distinct shapes that dynamically expand and contract, such as by osmosis. In an embodiment, the vesicles are emulsion templated, where the dispersed and continuous phase fluids yield the shape of the polyamide at the interface. Other possible shapes of the polyamide include hollowed fibers.

Figure 7:
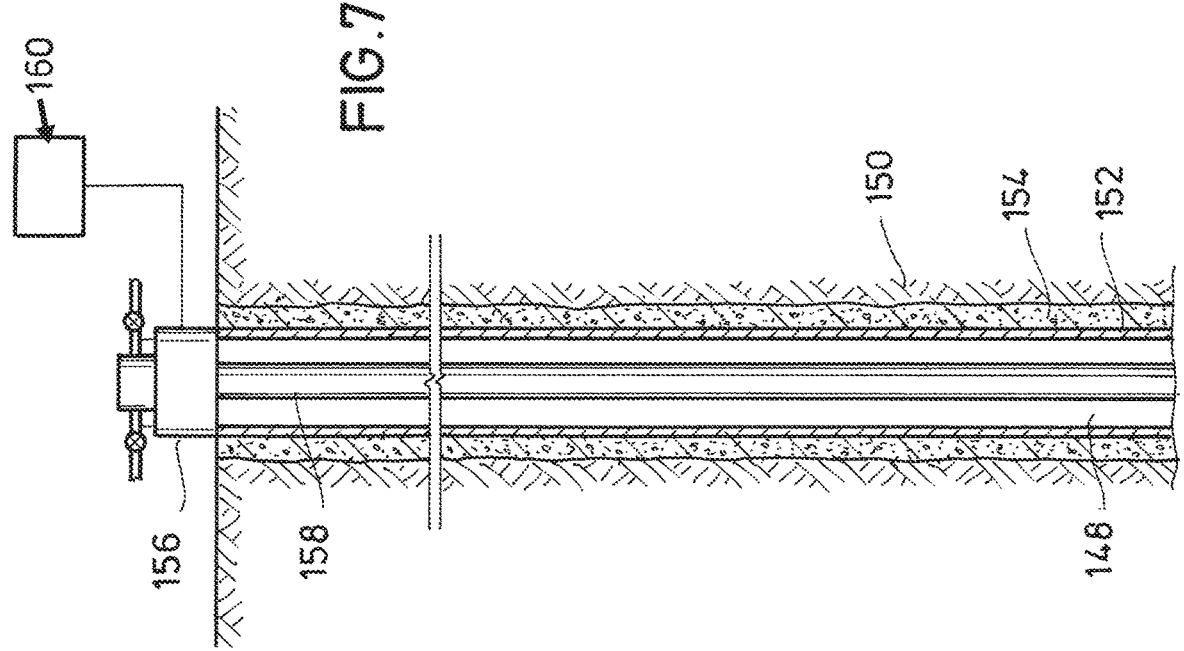
FIG. 7 is a side partial sectional view of an example of a wellbore having cement made in accordance with the present disclosure.

Referring now to FIG. 7, shown in a side partial sectional view is an example of a wellbore 148 intersecting a formation 150. Casing 152 lines the wellbore 148, and where cement 154 is disposed in an annular space between the casing 152 and wall of the wellbore 148. In an example, the cement 154 includes a polyamide, and can further include a polyamide made in accordance with the present disclosure, such as one or more of Polymers A-E and their combinations. A wellhead assembly 156 is shown mounted at an opening of the wellbore 148 and which contains pressure in the wellbore 148, as well as controlling flow from and into the wellbore 148. Production tubing 158 is shown deployed within the casing 152 and inside of which connate fluid produced from the formation 150 can be delivered to the wellhead assembly 156. An optional controller 160 is shown on surface and which is used to monitor downhole conditions in the wellbore 148, and that can convey signals downhole for operating production equipment (not shown), such as valves and packers.

In one example, crosslinking the polyaramide yields particles that are linear and particles that are three-dimensional. Thus crosslinking enhances the base polymer and forms a polymer network. Benefits of forming an aromatic compound include the advantages of rigidity and strength. Also, the alkane long chain of the 1,6-hexane diamine provides polymer flexibility. Another advantage of the polymer products described here include, the electron displacement between the amine, carbonyl and aromatic group, which yields an increase in binding between the polymer and the cement, and in turn enhances chemical interaction of the polymer to the cement. It has also been found to be advantageous to use different polymer moieties when forming the polyamide cement which increases ductility of cement and offers the potential for chemical interactions with cement and physical blocking by the polymer. In an example, physical blocking occurs when the polymers are insoluble they become particles embedded in the cement that serve as a physical barrier. These advantages provide a way to create a cement polymer with mechanical properties to prolong the lifespan of wellbore cement sheaths, thereby preventing cement casing annulus pressure problems.

The present disclosure, therefore, is well adapted to carry out the objects and attain the ends and advantages mentioned, as well as others inherent. While a presently preferred embodiment of the disclosure has been given for purposes of disclosure, numerous changes exist in the details of procedures for accomplishing the desired results. These and other similar modifications will readily suggest themselves to those skilled in the art, and are intended to be encompassed within the spirit of the present disclosure and the scope of the appended claims.

What is claimed is:

1. A cement composition for use in a wellbore comprising:
a cement comprising a calcium silicate;
a polyamide compound that is cross-linked and formed by reacting an aromatic triacid chloride with an amine; and
a bond between the wellbore and a tubular installed in the wellbore formed by injecting the composition into an annulus between the wellbore and the tubular.

2. The cement composition of claim 1, where the polyamide has a molecular weight ranging from about 189 Daltons to about 555 Daltons.

3. The cement composition of claim 1, where the polyamide was prepared by condensation of the aromatic tri-acid chloride with the diamine at room temperature by interfacial polymerization.

4. The cement composition of claim 1, where the amine comprises ethylenediamine.

5. The cement composition of claim 1, where the triacid chloride comprises 1,3,5-benzenetricarboxylic acid chloride.

6. The cement composition of claim 1, where the amine comprises 1,6-diaminohexane that is mixed with sebacoyl chloride.

7. The cement composition of claim 1, where the polyamide compound comprises an amount that ranges from about 1% by weight of the cement to about 6% by weight of the cement.

8. The cement composition of claim 1, where the amine comprises 1,3-diaminobenzene.

9. The cement composition of claim 1, where the amine comprises 1,4-diaminobenzene.

10. The cement composition of claim 1, where the amine comprises 1,6-diaminohexane.

11. The cement composition of claim 1, where the amine comprises 1,4-phenylenediamine.

12. A cement composition for use in a wellbore comprising:
a cement for bonding a tubular to a sidewall of the wellbore;
a polyamide compound that is cross-linked and formed by reacting an aromatic tri-acid chloride with an amine that comprises 1,6-diaminohexane mixed with sebacoyl chloride; and
a flow barrier in an annulus between the wellbore and a tubular installed in the wellbore defined when the composition is disposed in the annulus.

* * * * *